(12) United States Patent
Xiao et al.

(10) Patent No.: US 8,498,469 B2
(45) Date of Patent: Jul. 30, 2013

(54) FULL-FIELD MASK ERROR ENHANCEMENT FUNCTION

(75) Inventors: Guangming Xiao, Austin, TX (US);
Thomas C. Cecil, Menlo Park, CA (US);
Linyong Pang, Los Gatos, CA (US);
Robert E. Gleason, San Carlos, CA (US); John F. McCarty, Redwood City, CA (US)

(73) Assignee: Synopsys, Inc., Mountain View, CA (US)

( * ) Notice: Subject to any disclaimer, the term of this patent is extended or adjusted under 35 U.S.C. 154(b) by 614 days.

(21) Appl. No.: 12/715,351

(22) Filed: Mar. 1, 2010

(65) Prior Publication Data
US 2011/0211748 A1    Sep. 1, 2011

(51) Int. Cl.
*G06K 9/00*    (2006.01)
(52) U.S. Cl.
USPC ............... 382/144; 355/67; 355/53; 355/55; 355/77
(58) Field of Classification Search
USPC ............... 355/67, 53, 55, 77; 382/144, 145, 382/243
See application file for complete search history.

(56) References Cited

U.S. PATENT DOCUMENTS

| 6,563,566 | B2 | 5/2003 | Rosenbluth et al. |
| 6,709,792 | B2 | 3/2004 | Nakao |
| 7,107,573 | B2 | 9/2006 | Yamazoe et al. |
| 7,124,394 | B1 | 10/2006 | Abrams et al. |
| 7,178,127 | B2 | 2/2007 | Abrams et al. |
| 7,384,710 | B2 | 6/2008 | Ogawa et al. |
| 7,441,227 | B2 | 10/2008 | Abrams et al. |
| 7,480,889 | B2 | 1/2009 | Abrams et al. |

(Continued)

FOREIGN PATENT DOCUMENTS

| WO | WO 2005/078528 A2 | 8/2005 |
| WO | WO 2005/078528 A3 | 8/2005 |
| WO | WO 2011/011112 A1 | 1/2011 |

OTHER PUBLICATIONS

Xiao et al., "Source Optimization and Mask Design to Minimize MEEF in Low $k_1$ Lithography" SPIE, vol. 7028, 11 pgs., (Jun. 9, 2008).

(Continued)

*Primary Examiner* — Gregory J Toatley
*Assistant Examiner* — Iyabo S Alli
(74) *Attorney, Agent, or Firm* — Fenwick & West LLP

(57) ABSTRACT

A technique for determining a full-field Mask Error Enhancement Function (MEEF) associated with a mask pattern for use in a photo-lithographic process is described. In this technique, simulated wafer patterns corresponding to the mask pattern are generated at an image plane in an optical path associated with the photo-lithographic process. Then, the full-field MEEF is determined. This full-field MEEF includes MEEF values in multiple directions at positions along one or more contours that define boundaries of one or more features in the one or more simulated wafer patterns. Moreover, at least one of the MEEF values is at a position on a contour where a critical dimension for a feature associated with the contour is undefined.

20 Claims, 8 Drawing Sheets

U.S. PATENT DOCUMENTS

| | | | |
|---|---|---|---|
| 7,571,423 B2 * | 8/2009 | Abrams et al. ............... 382/145 |
| 7,698,665 B2 | 4/2010 | Abrams et al. |
| 7,703,068 B2 | 4/2010 | Abrams et al. |
| 7,707,541 B2 | 4/2010 | Abrams et al. |
| 7,757,201 B2 | 7/2010 | Abrams et al. |
| 7,984,391 B2 | 7/2011 | Abrams et al. |
| 7,992,109 B2 | 8/2011 | Abrams et al. |
| 8,056,021 B2 | 11/2011 | Abrams et al. |
| 2004/0265707 A1 | 12/2004 | Socha |
| 2005/0168498 A1 | 8/2005 | Granik |
| 2006/0050984 A1 * | 3/2006 | Tilton ............... 382/275 |
| 2007/0184357 A1 | 8/2007 | Abrams et al. |
| 2007/0198963 A1 | 8/2007 | Granik et al. |
| 2008/0180649 A1 * | 7/2008 | Hansen ............... 355/67 |
| 2008/0198350 A1 | 8/2008 | Sugita et al. |
| 2011/0022994 A1 | 1/2011 | Hu et al. |

OTHER PUBLICATIONS

Pang et al., "Considering MEEF in Inverse Lithography Technology (ILT) and Source Mask Optimization (SMO)" SPIE, vol. 7122, 14 pgs., (Oct. 17, 2008).

Pang, L., et al. "Full Chip Scale Source Mask Optimization (SMO) Implemented through Level Set Methods based Inverse Lithography Technology (ILT) Framework," Luminescent Litho Workshop 2009 Abstract, Apr. 29, 2009 vJM1

Rosenbluth, A. E., et al., "Optimum mask and source patterns to print a given shape," $JM^3$ 1(a) 13-30 (Apr. 2002), 2002 Society of Photo-Optical Instrumentation Engineers.

* cited by examiner

GENERATE ONE OR MORE SIMULATED WAFER PATTERNS CORRESPONDING TO A MASK PATTERN AT AN IMAGE PLANE IN AN OPTICAL PATH ASSOCIATED WITH A PHOTOLITHOGRAPHIC PROCESS
210

DETERMINE A FULL-FIELD *MEEF* THAT INCLUDES *MEEF* VALUES IN MULTIPLE DIRECTIONS AT POSITIONS ALONG ONE OR MORE CONTOURS THAT DEFINE BOUNDARIES OF ONE OR MORE FEATURES IN THE ONE OR MORE SIMULATED WAFER PATTERNS, WHERE AT LEAST ONE OF THE *MEEF* VALUES IS AT A POSITION ON A CONTOUR WHERE A CRITICAL DIMENSION (*CD*) FOR A FEATURE ASSOCIATED WITH THE CONTOUR IS UNDEFINED
212

| WAFER PATTERN 610-1 | FEATURES 612-1 | POSITIONS 614-1 | CONTOURS 616-1 | TOPOLOGICAL ENVIRONMENTS 618-1 | ... |

WAFER PATTERN 610-2

| FULL-FIELD MEEF 710-1 | MEEF VALUES 712-1 | POSITIONS 714-1 | CONTOURS (OPTIONAL) 616-1 | ... |

FULL-FIELD MEEF 710-2

...

FULL-FIELD MASK ERROR ENHANCEMENT FUNCTION

BACKGROUND OF THE INVENTION

1. Field of the Invention

The present invention relates to systems and techniques for determining a full-field Mask Error Enhancement Function associated with photo-masks for use in photo-lithography.

2. Related Art

Photo-lithography is a widely used technology for producing integrated circuits. In this technique, a light source illuminates a photo-mask. The resulting spatially varying light pattern is projected onto a photoresist layer on a semiconductor wafer by an optical system (referred to as an exposure tool). By developing the 3-dimensional pattern produced in this photoresist layer, a layer in the integrated circuit is created. Furthermore, because there are often multiple layers in a typical integrated circuit, these operations may be repeated using several photo-masks to produce a product wafer.

As dimensions in integrated circuits steadily become a smaller fraction of the wavelength of the light used to expose images of the photo-mask onto the wafer (which corresponds to a low $k_1$ factor in the photo-lithographic process), it is becoming increasingly difficult to design and manufacture photo-masks that produce the desired target wafer pattern on the wafer. As a consequence, the structures in or on the ideal photo-mask (also referred to as the target mask pattern) and/or the physical structures in or on the actual photo-mask bear less and less resemblance to the desired target wafer pattern. These differences between the photo-mask and the target wafer pattern (which are sometimes referred to as 'resolution enhancement technology' or RET) are used to compensate for the diffraction and optical-proximity effects that occur when light is transmitted through the optics of the exposure tool and is converted into the 3-dimensional pattern in the photoresist.

When designing photo-masks for use in the low $k_1$-factor regime, the manufacturing performance of a given RET solution is often evaluated in photo-lithography simulations based on the process window, which determines how sensitive the photo-lithographic process is to manufacturing process variations. Note that the process window can be characterized by its depth of focus (DOF) at a given exposure latitude (EL).

Traditionally, the process-window calculation assumes a perfect photo-mask, with no photo-mask errors or corner rounding. However, in the low $k_1$-factor regime the consequences of photo-mask errors for the resulting wafer pattern (which are often measured using the Mask Error Enhancement Factor or MEEF) are large enough that photo-mask errors can no longer be ignored when calculating the process-window. Consequently, a limited number of MEEF values are typically calculated based on critical-dimension (CD) changes across cutlines that are associated with photo-mask errors.

Unfortunately, the extensive use of RET in the low $k_1$-factor regime significantly increases the complexity of the two-dimensional photo-lithography simulations because of strong optical-proximity effects among neighboring features and the strong correlations between the illumination conditions, the photo-mask and the RET solution. As a consequence, analyzing and characterizing the MEEF using the traditional limited-cutline CD technique may not be sufficient to assure the identification of all lithographically marginal locations when designing a complicated photo-lithographic process.

Hence, what is needed is a MEEF analysis technique that overcomes the problems listed above.

SUMMARY OF THE INVENTION

The present disclosure relates to a computer system that determines a full-field Mask Error Enhancement Function (MEEF) associated with a mask pattern for use in a photo-lithographic process. During operation, the computer system generates one or more simulated wafer patterns corresponding to the mask pattern at an image plane in an optical path associated with the photo-lithographic process. Then, the computer system determines the full-field MEEF, which includes MEEF values in multiple directions at positions along one or more contours that define boundaries of one or more features in the one or more simulated wafer patterns, where at least one of the MEEF values is at a position on a contour where a critical dimension (CD) for a feature associated with the contour is undefined.

Note that the one or more simulated wafer patterns may include one or more aerial images. Moreover, the mask pattern used to generate a given aerial image in the one or more images may be biased. This bias may include a geometric change in a feature in the mask pattern relative to an initial mask pattern.

Furthermore, determining the full-field MEEF may involve calculating a gradient of the one or more simulated wafer patterns along normal(s) to the one or more contours. For example, the gradient may include the derivative of the one or more simulated wafer patterns along the normal(s) to the one or more contours. Additionally, determining the full-field MEEF may involve calculating a ratio of a change in the one or more contours relative to the bias.

In some embodiments, the one or more simulated wafer patterns include simulated development of photoresist.

Moreover, the one or more simulated wafer patterns may be calculated using a forward optical calculation with the mask pattern at an object plane of the optical path.

Note that a given MEEF value may be determined for a given contour. For example, a given MEEF value may be determined for either or both contours in a given pair of contours on opposite sides of a given feature in the one or more simulated wafer patterns.

A wide variety of formats may be used for the full-field MEEF. These formats include: a pixel-based format (such as where the pixels have a regular spacing); a segment-based format; and/or a format where the full-field MEEF is a two-dimensional function.

In some embodiments, a given MEEF value in the full-field MEEF corresponds to a topological environment of a given feature in the one or more simulated wafer patterns.

Another embodiment provides a method that includes at least some of the operations performed by the computer system.

Another embodiment provides a computer-program product for use with the computer system. This computer-program product includes instructions for at least some of the operations performed by the computer system.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 is a flow chart illustrating a process for determining the full-field MEEF of FIG. 1B in accordance with an embodiment of the present disclosure.

FIG. 6 is a block diagram illustrating a data structure for use in the computer system of FIG. 5 in accordance with an embodiment of the present disclosure.

FIG. 7 is a block diagram illustrating a data structure for use in the computer system of FIG. 5 in accordance with an embodiment of the present disclosure.

Figure 1A:
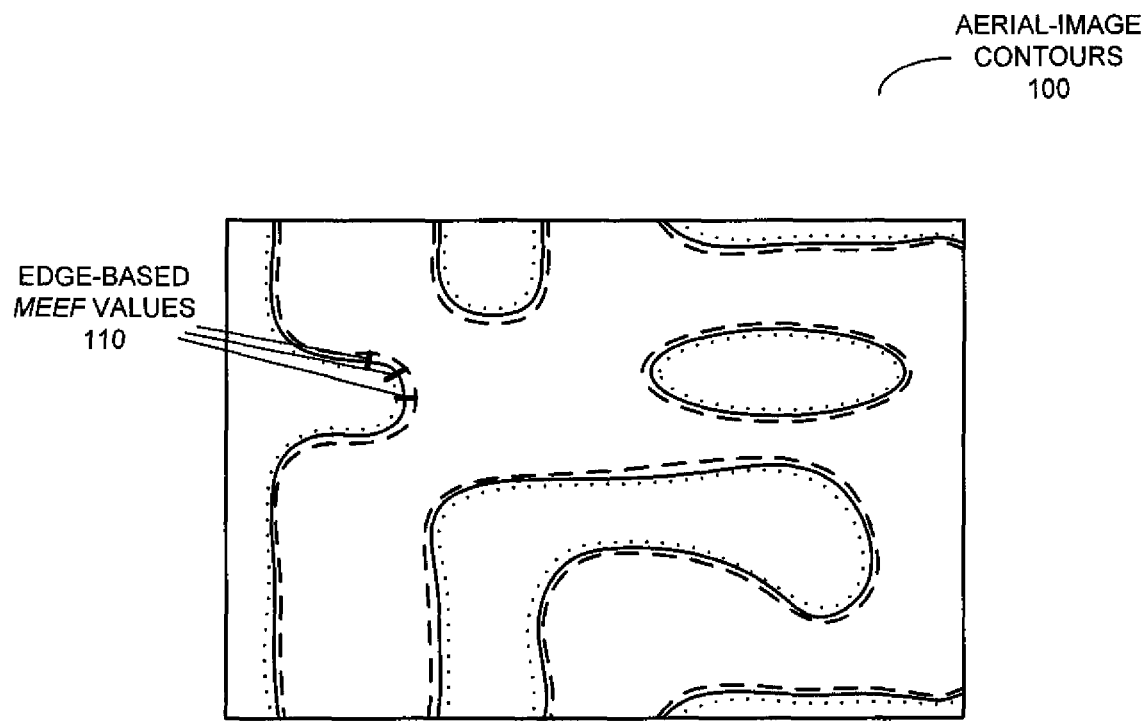
FIG. 1A is a drawing illustrating the calculation of several edge-based Mask Error Enhancement Function (MEEF) values associated with aerial-image contours for a mask pattern for use in a photo-lithographic process in accordance with an embodiment of the present disclosure.
Figure 1B:
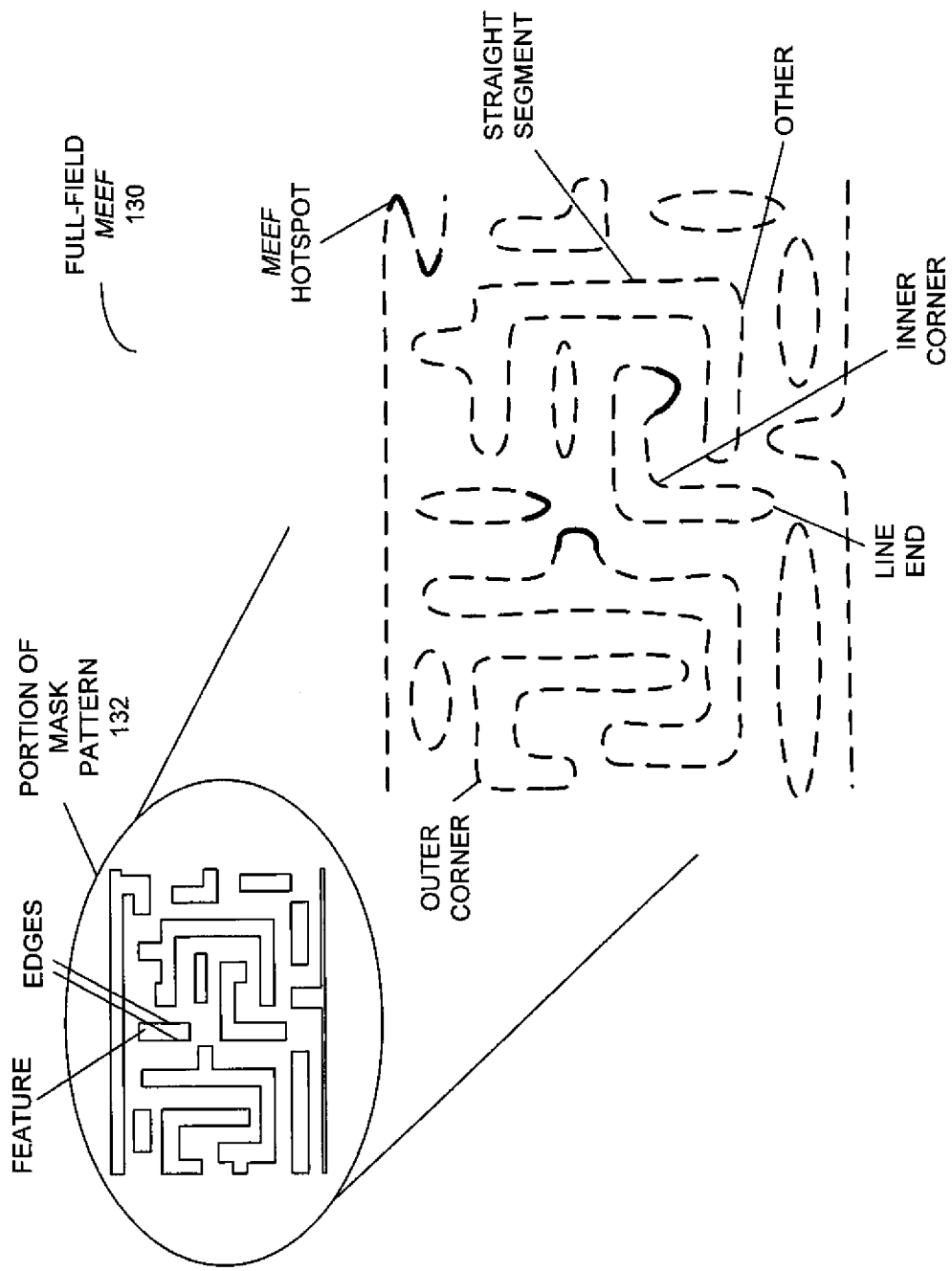
FIG. 1B is a drawing of a full-field Mask Error Enhancement Function (MEEF) associated with aerial-image contours for the mask pattern for use in the photo-lithographic process in accordance with an embodiment of the present disclosure.

Table 1 at paragraph 0039 provides MEEF statistics associated with different types of topology environments in the full-field MEEF in FIG. 1B in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a technique for determining a full-field Mask Error Enhancement Function (MEEF) associated with a mask pattern for use in a photo-lithographic process, and a computer program product (i.e., software) for use with the computer system are described. In this technique, simulated wafer patterns corresponding to the mask pattern are generated at an image plane in an optical path associated with the photo-lithographic process. Then, the full-field MEEF is determined. This full-field MEEF includes MEEF values in multiple directions at positions along one or more contours that define boundaries of one or more features in the one or more simulated wafer patterns. Moreover, at least one of the MEEF values is at a position on a contour where a critical dimension for a feature associated with the contour is undefined.

By determining the full-field MEEF, this analysis technique may provide a more comprehensive view of the MEEF distribution and detailed analysis that can be used when designing the mask pattern for the photo-mask (as well as other aspects of the photo-lithographic process). Consequently, the analysis technique may facilitate high-yield photo-lithography with reduced time-to-market and costs in the low $k_1$-factor regime.

We now describe embodiments of the analysis technique. Traditionally, MEEF is defined as the one-dimensional wafer critical-dimension (CD) variation as a function of the mask pattern CD variation, i.e., $$MEEF = \frac{\partial CD_{wafer}}{\partial CD_{photo-mask}}.$$

Moreover, the MEEF for a given mask pattern is typically determined along a limited number of cutlines.

When a printed feature is much larger than the Rayleigh resolution limit of projection optics, the MEEF is small and close to unity. In addition, the changes in the CD at left and right edges of a feature on the wafer in response to a mask-pattern error are small. Consequently, the MEEF calculated from CD variation provides a reasonable estimate of the sensitivity of either edge to mask-pattern variation.

However, at low $k_1$ the MEEF increases substantially, and the differing response of the left and right edges of a feature to a photo-mask error in complicated two-dimension situations where there are optical proximity effects cannot be ignored. Furthermore, it may be difficult to capture the asymmetry of edge movement to photo-mask error using a CD-based MEEF calculation. In order to truly reflect the sensitivity of each edge to a photo-mask error, an edge-based MEEF calculation is proposed, i.e., $$MEEF_{edge} = \frac{\partial EPE_{wafer}}{\partial EPE_{photo-mask}}\bigg|_{normal},$$

where Edge Placement Error (EPE) is used instead of CD. Note that $\partial EPE_{mask}$ is the mask perturbation at a position along a given edge of a feature (which equals to one-half of $\partial CD_{mask}$ in the traditional definition of MEEF, i.e., when the mask pattern is evenly biased). Moreover, $\partial EPE_{wafer}$ is measured as the distance between the aerial-image contour associated with a perturbed mask pattern and the image contour associated with a nominal mask pattern along its normal direction. Therefore, the edge-based MEEF can be extracted from the ratio of perturbation from wafer to mask pattern. For example, two edge-based MEEF values can be respectively calculated about a nominal edge for positively (+) and negatively (−) biased mask patterns. The two MEEF values are usually slightly different from each other due to asymmetric response to up bias and down bias. Furthermore, the magnitude of the difference in the MEEF of the +/−biased mask patterns may depend on a local environment and, as described further below, may be more pronounced for a high MEEF area. Because the photo-mask error can be either positive or negative, the average of the MEEF values for the +/−biased mask patterns may be used. FIG. 1A presents a drawing illustrating the calculation of several edge-based MEEF values 110 associated with aerial-image contours 100 for a mask pattern for use in a photo-lithographic process. Note that the solid line represents the aerial-image contour for the nominal edge position, the dotted line represents the aerial-image contour for the negatively biased mask pattern, and the dashed line represents the aerial-image contour for the positively biased mask pattern.

A collection of edge-based MEEF values along every segment in a two-dimensional aerial-image contour may constitute a full-field MEEF. Because of the spatial variation of the MEEF, the aerial-image contours may be divided into small segments (such as pixels) in order to accurately calculate the MEEF everywhere along the contour. This is shown in FIG. 1B, which presents a drawing of a full-field MEEF 130 associated with the aerial-image contours for a portion 132 of the mask pattern for use in the photo-lithographic process. (More generally, full-field MEEF 130 may be associated with one or more mask patterns and/or one or more associated source patterns that are used to illuminate the one or more mask patterns, which may be calculated during the design of the photo-lithographic process. Note that the one or more mask patterns and the one or more associated source patterns may be designed separately or concurrently.) In some embodiments, the edge-based MEEF value for each pixel in the full-field MEEF is color coded, which may allow a designer to visually identify 'hotspots' in the full-field MEEF. For viewing convenience and clarity, in FIG. 1B these hotspots are shown in bold, while the remainder of the MEEF values are illustrated by dashed lines.

As shown in FIG. 1B, there can be asymmetry in the MEEF values across a pair of edges on opposite sides of a feature because of different optical-proximity environments. In contrast, traditional CD cutline-based MEEF analysis will average out the two edges of a feature. This may result in an underestimate of the MEEF value, which can potentially hide a serious design problem.

Note that the tolerance for process variation can be different for different parts of a design. For example, the tolerance for the inner corner of a metal line can be much higher than for a line end. To provide a better assessment of MEEF, MEEF statistics may be determined for different types of topology environments in the mask pattern, such as: line ends, outer corners, inner corners, straight segments, etc. Table 1 presents MEEF statistics (including maximum and average MEEF) associated with different types of topology environments in full-field MEEF 130 (FIG. 1B). Note that the overall MEEF statistics for full-field MEEF 130 (FIG. 1B) include a maximum MEEF of 6.80, an average MEEF of 2.66, and a standard deviation of 0.71.

TABLE 1

| Topology | Maximum MEEF | Average MEEF |
|---|---|---|
| Line End | 6.80 | 3.59 |
| Smooth Segment | 4.82 | 2.38 |
| Outer Corner | 5.71 | 3.39 |
| Inner Corner | 4.22 | 2.88 |
| Other | 6.79 | 2.75 |

When evaluating the performance of a given resolution-enhancement-technology (REI) solution, the process window may be evaluated using simulations of the photo-lithographic process. This may allow a desired minimum depth of focus (DOF) to be obtained at a given exposure latitude (EL). As noted previously, a process-window calculation traditionally is based on a perfect mask, which assumes no photo-mask errors, no corner rounding, etc. In reality, process variation results in residual photo-mask errors that affect the process window for on-wafer printing. When the MEEF is low, the impact of photo-mask errors is typically small compared to the total process-variation budget. However, in a low $k_1$ regime the MEEF increases substantially, for example, to 4-6 (or even higher), and photo-mask errors may be magnified several-fold and may have a much more pronounced impact at the wafer level. Consequently, DOF predictions that do not consider MEEF may be unrealistically optimistic.

In order to obtain a more realistic view of the total process variations, photo-mask error may be factored into the process-window calculations. For example, given a mask-pattern bias (m) that is inferred from mask-pattern targeting specifications, the MEEF-aware process window may be calculated as the common process window of unbiased and +/−m biased mask patterns. In an exemplary embodiment, when MEEF and a 1-nm mask-pattern bias were included in the calculations, a DOF at 5% EL was reduced from approximately 220 nm to approximately 145 nm.

In addition to the process window, another useful way to study the predicted quality of a printed image (i.e., the wafer pattern) is by analyzing process-variation bands. A process-variation band may be determined by calculating wafer aerial images at various process conditions, and then combining the resulting images into a band. The width of this band represents the range within which a feature will print as the process conditions vary. Typically, the conditions used to generate process-variation bands are the percentage EL and defocus. However, if MEEF and photo-mask error are also included in the process-variation conditions, a much larger band area may be generated. This suggests a much worse aerial-image variation than would result from a perfect mask-pattern assumption. Thus, ignoring or including MEEF and photo-mask error in these simulations may, respectively, represent the best- and worst-case scenarios from photo-mask variations. The actual variation is expected to fall between these two extreme scenarios.

Note that current state-of-the-art photo-mask processes incorporate: advanced variable-shaped e-beam mask writers, high-contrast chemically amplified photoresist, and a low-etch bias process. Consequently, pattern fidelity on the reticle has reached an unprecedented level of performance. However, some corner rounding is still typically present. Because MEEF is sensitive to the mask-pattern shape and size, corner rounding may be considered when running a simulation of an RET mask pattern. For example, without mask-pattern corner rounding, the maximum MEEF and the average MEEF in the full-field MEEF for a target mask pattern may be 7.29 and 2.88, respectively. However, when 15-nm of mask-pattern corner rounding is applied, both the maximum and average MEEF values in the full-field MEEF may be respectively reduced to 6.82 and 2.84. This suggests that MEEF tends to be over-estimated in simulations when mask-pattern corner rounding is not considered. In particular, mask-pattern corner rounding was found to have a significant impact on corners and line ends, while having little effect on long straight segments or edges.

Similarly, the analysis technique may be applied to determine the impact of sub-resolution assist features (SRAFs) in the mask pattern. Because of the high contrast of photoresist, many mask patterns can produce identical contours, as long as their images are dark enough and bright enough in the interior and exterior regions defined by the contours. These additional degrees of freedom allow optimization of more than just the desired contours. For example, contours obtained with different mask patterns may be identical under nominal conditions, yet may exhibit different sensitivities to errors in dose, defocus, or in the sizes of mask patterns. In general, minimizing the sensitivity of the contours to each of these variables may yield a different solution, such as when the mask pattern is determined using an inverse optical calculation (which is sometimes referred to as 'inverse lithography') based on a desired target wafer pattern and the optical path in the exposure tool in the photo-lithographic process.

Because the sensitivity of wafer patterns to these sources of error varies, the ideal inverse solution to the inverse optical calculation may allow optimization under a weighted average of their effects. For example, an objective cost function may be defined based on a weighted sum of pattern-edge placement errors. In addition to covering a selected set of dose, defocus, and photo-mask error conditions, the cost function may also include weights based on the relative importance of controlling the dimensions of different types of features, such as: long straight edges or segments, line ends, jogs, and corners. Note that the objective of inverse lithography may be to find a mask pattern that minimizes the cost function using a gradient-descent technique in a vector space. Moreover, a solution with high EL, large DOF, and low sensitivity to photo-mask errors is the goal of any photo-lithographic process. Unfortunately, a trade-off often must be made among these goals. One example which illustrates this problem is the impact of SRAF pitch on MEEF. In particular, if SRAFs are placed with minimum width and spacing (i.e., tight pitch) in order to achieve a desired minimum DOF, any perturbation of the size of the features in the mask pattern may result in a pronounced effect on the aerial image, and thus on the DOF and MEEF. In general, larger SRAFs tend to produce a larger DOF, but higher MEEF as well. When the SRAF size is decreased, the DOF also decreases, but at the same time the MEEF is reduced. Note that the SRAF size can only be reduced either to the minimum SRAF width or until the minimum acceptable DOF is reached. Furthermore, increasing the SRAF size may eventually result in either sidelobe printing, or a violation of the minimum spacing requirement in the mask rules. However, within these constraints, DOF and MEEF can be traded off to give the optimal combination of conditions.

Figure 1C:
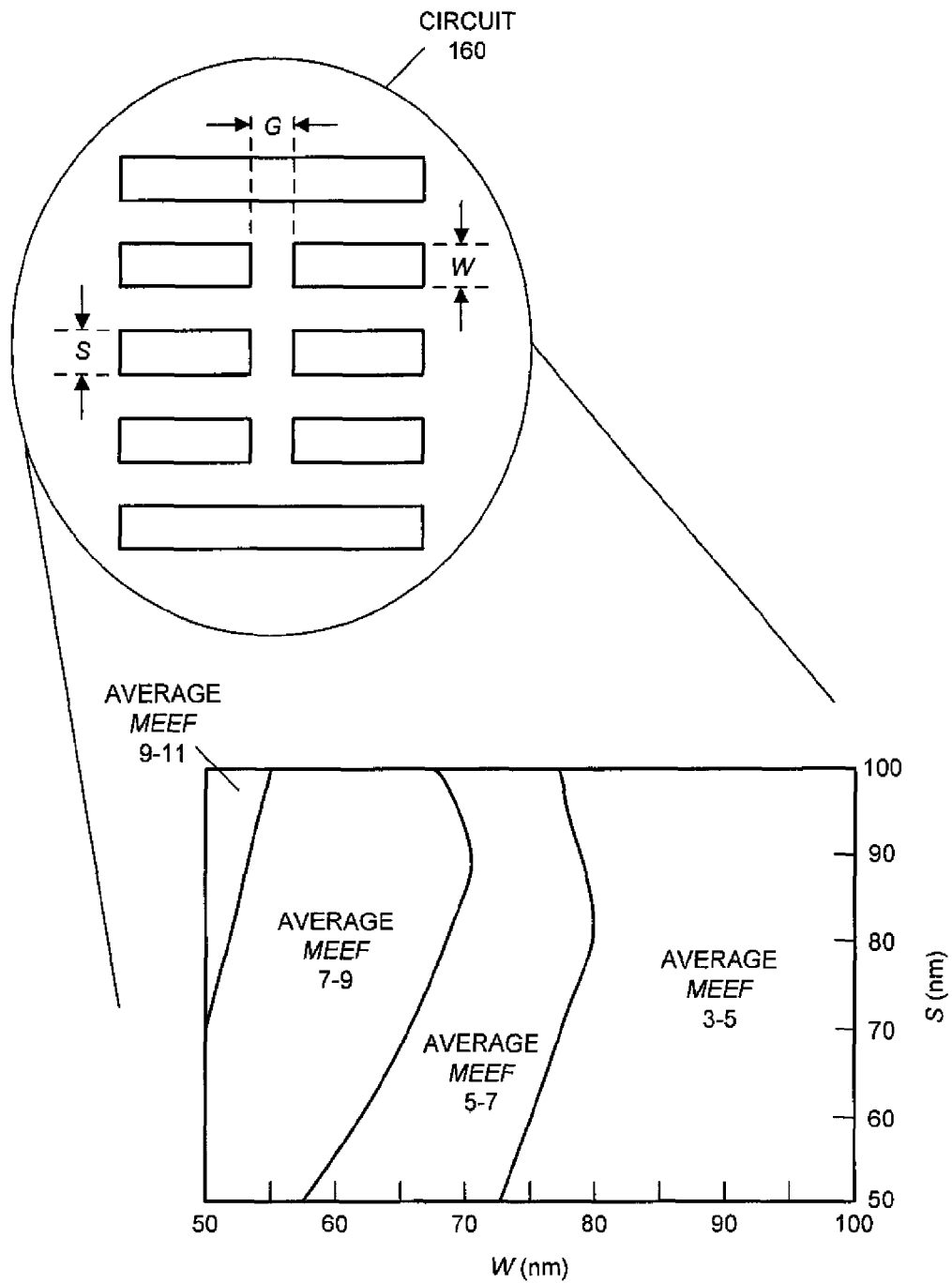
FIG. 1C is a drawing of average MEEF contours associated with parameters in a design-rule space in the photo-lithographic process in accordance with an embodiment of the present disclosure.

In another embodiment, full-field MEEF was used to explore design rules for a circuit design. The results of this analysis for circuit 160 with a pre-defined illumination configuration (including dose, defocus, and photo-mask error) is shown in FIG. 1C, which presents a drawing of average MEEF contours associated with parameters in a design-rule space in the photo-lithographic process at a common DOF. In this analysis, circuit 160 includes metal lines, and the parameter space includes metal width (W), space (S) and metal line-end gap width (G) (which was equal to 50 nm in the simulations). Based on this analysis, average MEEF values less than 5 define the acceptable portion of the design-rule space, thereby specifying acceptable ranges for S and W.

In general, when MEEF is included in the analysis, different design rules result for circuit 160 than when DOF is considered alone. A similar methodology may be applied to identify 'weak' spots in a layout cell/block libraries so that they can be updated with a more lithography-compliant and manufacturable design. Identifying these 'weak' spots when the cell is created may reduce the number of re-spins for post-tapeout tweaks and post-layout design fixes, thereby reducing the time to market.

FIG. 2 presents a flow chart illustrating a process 200 for determining full-field MEEF 130 (FIG. 1B), which may be performed by computer system 400 (FIG. 4) [computer system 500 (FIG. 5)?]. During operation, the computer system generates one or more simulated wafer patterns corresponding to the mask pattern at an image plane in an optical path associated with the photo-lithographic process (operation 210). Then, the computer system determines the full-field MEEF (operation 212), which includes MEEF values in multiple directions at positions along one or more contours that define boundaries of one or more features in the one or more simulated wafer patterns, where at least one of the MEEF values is at a position on a contour where a critical dimension (CD) for a feature associated with the contour is undefined (for example, where the feature has only one edge where the MEEF value is calculated).

Note that the one or more simulated wafer patterns may include one or more aerial images. Moreover, the mask pattern used to generate a given aerial image in the one or more images may be biased. This bias may include a geometric change in a feature in the mask pattern relative to an initial mask pattern.

Furthermore, determining the full-field MEEF may involve calculating a gradient of the one or more simulated wafer patterns along a normal(s) to the one or more contours. For example, the gradient may include the derivative of the one or more simulated wafer patterns along the normal(s) to one or more contours. Additionally, determining the full-field MEEF may involve calculating a ratio of a change in the one or more contours relative to the bias.

In some embodiments, the one or more simulated wafer patterns include simulated development of photoresist.

Moreover, as described further below with reference to FIG. 3, the one or more simulated wafer patterns may be calculated using a forward optical calculation with the mask pattern at an object plane of the optical path.

Note that a given MEEF value may be determined for a given contour. For example, a given MEEF value may be determined for either or both contours in a given pair of contours on opposite sides of a given feature in the one or more simulated wafer patterns.

A wide variety of formats may be used for the full-field MEEF. These formats include: a pixel-based format (such as where the pixels have a regular spacing); a segment-based format; and/or a format where the full-field MEEF is a two-dimensional function. For example, the full-field MEEF may be a bitmap or grayscale file that includes a set of values corresponding to pixels in an image. Such a pixel-based format may allow visual identification by a designer of so-called 'hotspots' in a photo-lithographic process (such as when designing the mask pattern for the photo-mask and/or an associated source pattern). Alternatively, the same information content may be provided by a vector-based format.

In some embodiments, a given MEEF value in the full-field MEEF corresponds to a topological environment (such as an inner corner, an outer corner, a line end, or a straight segment) of a given feature in the one or more simulated wafer patterns.

Note that in some embodiments of process 200 there are additional or fewer operations, the order of the operations may be changed, and two or more operations may be combined into a single operation. For example, the one or more wafer patterns in operation 210 may be simulated for a variety of scenarios, including out-of-focus conditions, different wavelengths, dose variations, etc.

Figure 3:
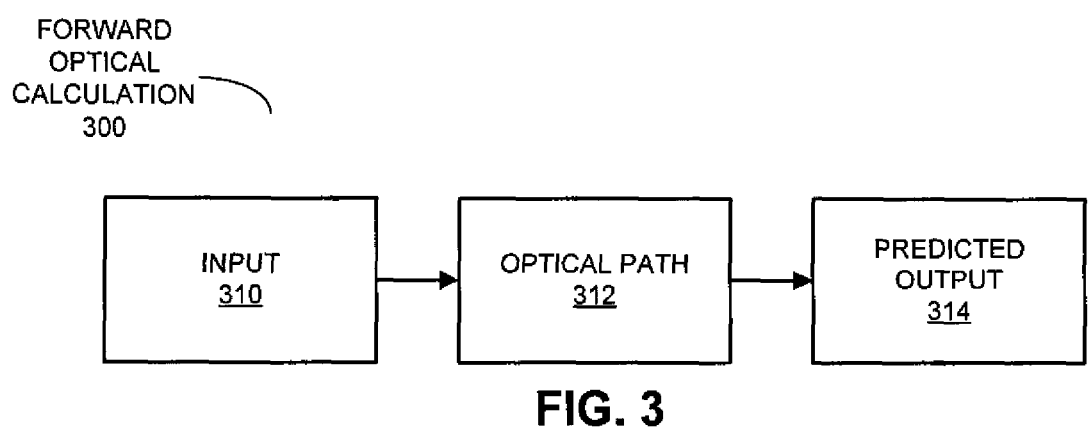
FIG. 3 is a block diagram illustrating a forward optical calculation in accordance with an embodiment of the present disclosure.

FIG. 3 presents a block diagram illustrating a forward optical calculation 300. In this forward optical calculation, a predicted output 314 (such as one of the simulated wafer patterns) is determined using an optical path 312 having a suitably illuminated input 310 (such as the mask pattern) at one of its object planes. In this case, optical path 312 corresponds to an exposure tool in the photo-lithographic process. Note that optical path 312 may include some or all of the aspects of the photo-lithographic process, such as illumination settings, the electromagnetics of the photo-mask, the stepper optics, etc. Furthermore, as noted previously, this lithographic simulation may include a model of a photoresist used in the photo-lithographic process, flare and/or etch effects.

Note that calculations corresponding to optical path 312 in forward optical calculation 300 may be implemented using Fourier-optical techniques. Furthermore, optical path 312 may include multiple models of optical paths, such as when aerial images for two or more different exposure conditions are used to determine a simulated wafer pattern. Also note that while optical path 312 has been traversed in a particular direction, in some embodiments this optical path may be traversed in either direction. Thus, in some embodiments, an inverse optical calculation is used.

We now describe an exemplary embodiment of the forward optical calculation used when determining a simulated wafer pattern. For simplicity, coherent illumination of the mask pattern is utilized. Furthermore, the electric field falling upon the mask pattern is approximately constant. Thus, the clear regions of the mask pattern pass the light, while the opaque regions block the light. It follows that a scalar electric field E, just behind the mask pattern, may be expressed as $$E(\vec{r}) = \begin{cases} 0 & \text{chrome} \\ 1 & \text{glass} \end{cases},$$

where $\vec{r}=(x, y)$ is a point on the (x,y) plane. This representation of the mask pattern may be re-expressed using a function $\phi$ (referred to as a level-set function) having positive regions that indicate glass and negative regions that indicate chrome. Furthermore, the level-set function may equal zero at the boundaries or contours of the mask pattern. Therefore, the electric field E associated with the mask pattern may be re-expressed as a function of this level-set function, i.e., $$E(\vec{r}) = \hat{h}(\phi(x,y)),$$

where $\hat{h}$ is the Heaviside function $$\hat{h}(x) = \begin{cases} 1 & x \geq 0 \\ 0 & x < 0 \end{cases}.$$

Because an ideal diffraction limited lens acts as a low-pass filter, this may be used as an approximation to the actual (almost but not quite perfect) lens in the optical path of the exposure tool. Mathematically, the action of the lens may be expressed as $$A(\vec{r}) = f^{-1}(\hat{C}(f(E(\vec{r}))))$$

where $A(\vec{r})$ indicates the electric field distribution on the wafer, f indicates the Fourier transform, $f^{-1}$ indicates the inverse Fourier transform, and $\hat{C}$ indicates the pupil cutoff function, which is zero for frequencies larger than a threshold determined by the numerical aperture of the lens, and one otherwise. Thus, the pupil function is $$\hat{C}(k_x, k_y) = \hat{h}(k_{max}^2 - [k_x^2 + k_y^2]) = \begin{cases} 0 & k_x^2 + k_y^2 \geq k_{max}^2 \\ 1 & k_x^2 + k_y^2 < k_{max}^2 \end{cases},$$

wherein $k_x$, $k_y$, and $k_{max}$ represent frequency coordinates in Fourier space. Therefore, the aerial image at the wafer is simply the square of the electric field $$I(\vec{r}) = |A(\vec{r})|^2.$$

Combining these two equations, we find $$F(\phi(x,y)) = (|f^{-1}(\hat{C}(f(\hat{h}(\phi(x,y)))))|^2).$$

This is a self-contained formula for the image seen by the wafer. In some embodiments, the simulated wafer pattern is expressed as a level-set function during the forward optical calculation. Then, when the calculation is finished, the simulated wafer pattern may be determined by evaluating this level-set function in a plane of the wafer (e.g., the wafer pattern may correspond to values where the level-set function equals zero).

Note that this is just one embodiment of the forward projector that can be used within the scope of this invention, chosen by way of example due to its relative simplicity. More sophisticated forward optical calculations also fall within the scope of the present invention. Such models may take into account, by way of example but not limitation, various illumination conditions (e.g., off-axis, incoherent), the actual electromagnetics of the light field interacting with the photomask, various types of photo-masks other than chrome on glass (e.g., attenuated phase shifting, strong phase shifting, other materials, etc.), the polarization of the light field, the actual properties of the lens (such as aberrations), and/or the vector nature of the electromagnetic field as it propagates through optical path 312 (FIG. 3).

Figure 4:
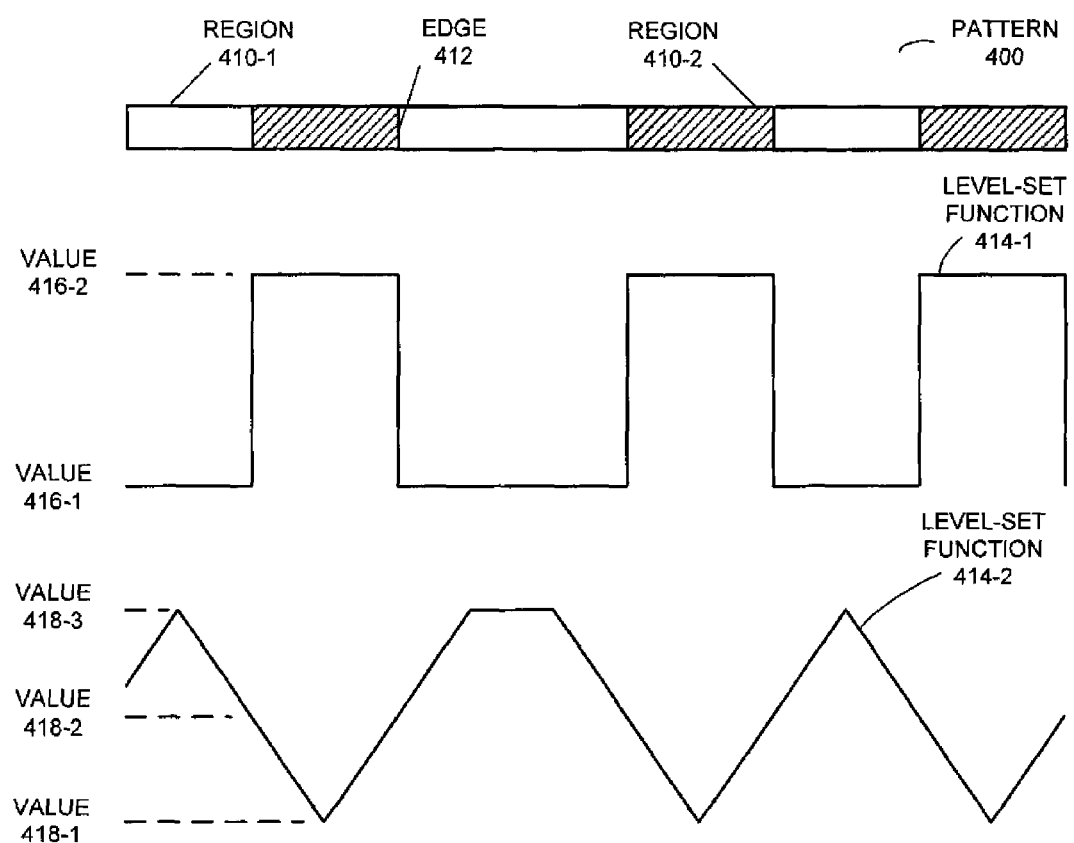
FIG. 4 is a diagram illustrating a pattern and corresponding level-set functions in accordance with an embodiment of the present disclosure.

We now describe the level-set functions in more detail. In the forward optical calculation, the mask pattern(s) and/or the simulated wafer pattern may be represented using one or more functions having a set of values that is larger than the actual mask pattern(s) and/or the simulated wafer pattern. As discussed previously, in one embodiment the one or more functions include one or more level-set functions. This is illustrated in FIG. 4, which provides a pattern 400 and corresponding level-set functions 414. Pattern 400 includes alternating regions 410, such as glass and chromium (for a mask pattern) or features and spaces (for a simulated wafer pattern). Transitions from one region to another are characterized by a contour or an edge, such as edge 412. When viewed from a direction perpendicular to a plane of FIG. 4, edges (such as edge 412) define pattern 400.

Level-set function 414-1 has two values 416. Edge 412 may correspond to a mid-point between these two values 416. In contrast, level-set function 414-2 has three values 418, and edge 412 may correspond to value 418-2. While not illustrated in FIG. 4, level-set functions 414 extend into the plane of FIG. 4 (i.e., they are 3-dimension functions). As is known to one of skill in the art, there are many alternate level-set functions and/or configurations that may be used. For example, in some embodiments one or more separate level-set functions and/or separate images may be used for the one or more simulated wafer patterns.

As illustrated by level-set function 414-2, in some embodiments the level-set function may be expressed as a signed distance function relative to the contour or edge 412 (i.e., the value of the level-set function in at least a region is a function of the distance from edge 412). This formulation may allow effects that occur nearer to edge 412 to be highlighted. However, because features in mask patterns and patterned wafers may occur at random locations (including those far removed from edge 412), level-set function 414-1 may be useful in that it provides an equal weighting with respect to edge 412.

In some embodiments, the forward optical calculation is divided into a series of overlapping sub-problems (also referred to as work units), at least some of which are processed independently and/or concurrently. These work units may be based on elements or structures (for example, repetitive structures) in the mask pattern. Furthermore, in some embodiments the work units may partially overlap neighboring work units. For example, the work units may be between 10,000 nm$^2$ or 100 µm$^2$ in size.

In some embodiments, the forward optical calculation is run for 100, 1000 or 10,000 iterations (during which the level-set function corresponding to the simulated wafer pattern is incremented) at which point the optimal solution has been determined. In other embodiments, the calculation is stopped based on convergence criteria, such as: oscillatory behavior, a relative and/or absolute difference (such as 1%) between the simulated wafer pattern and a target wafer pattern (such as a Graphic Design System II or OASIS file representing an integrated circuit). Note that in some embodiments, the level-set function is re-distanced (i.e., restored to one having the distance function property relative to edge 412) at intermediate iterations during the calculation. In an exemplary embodiment, such re-distancing occurs at least every 20 iterations (for example, every 14 iterations).

Figure 5:
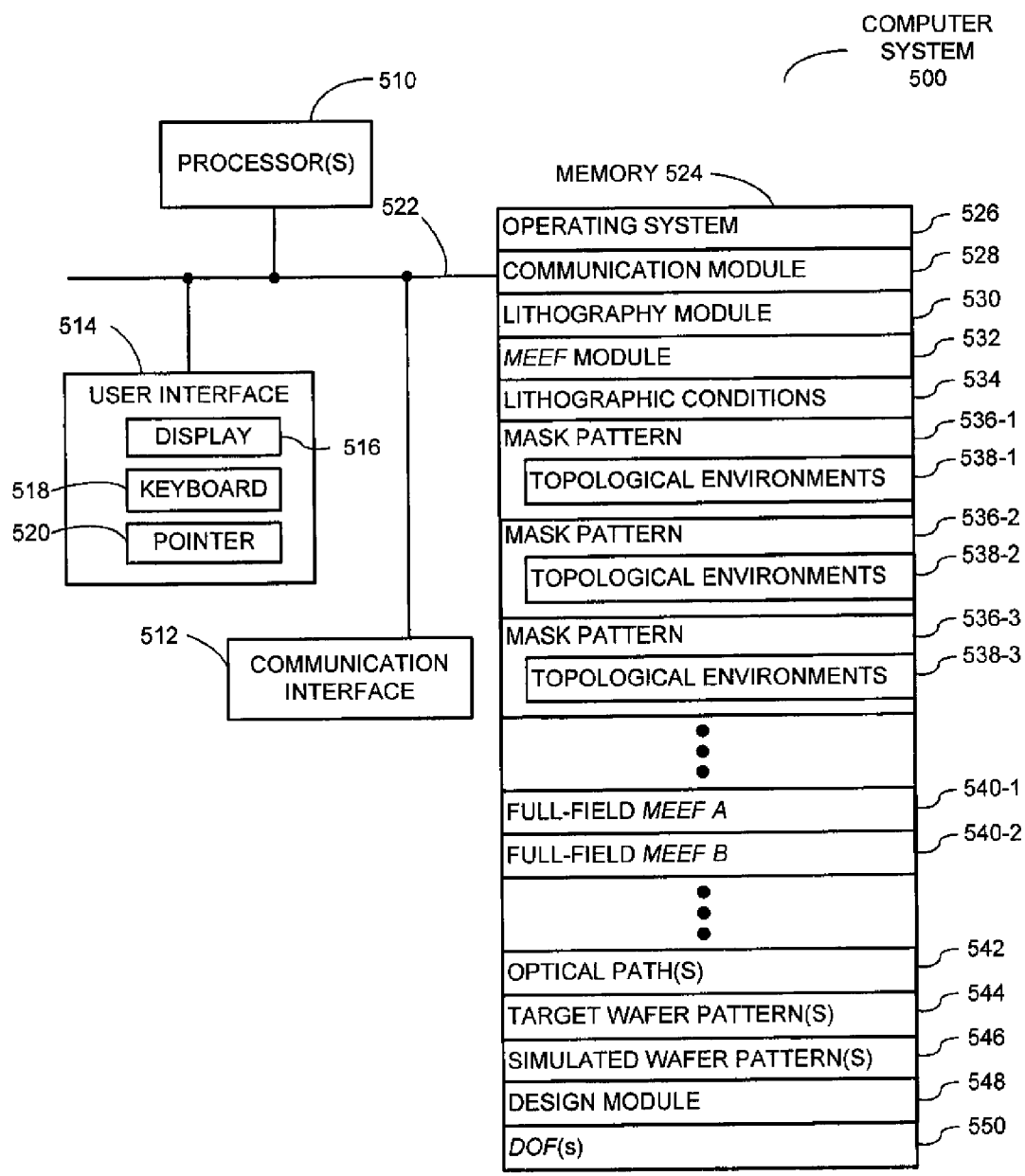
FIG. 5 is a block diagram illustrating a computer system that performs the process of FIG. 2 in accordance with an embodiment of the present disclosure.

We now discuss computer systems for determining a full-field MEEF. FIG. 5 presents a block diagram illustrating a computer system 500 that performs process 200 (FIG. 2). This computer system includes one or more processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include a display 516, a keyboard 518, and/or a pointer 520, such as a mouse.

Memory 524 in the computer system 500 may include volatile memory and/or non-volatile memory. More specifically, memory 524 may include ROM, RAM, EPROM, EEPROM, FLASH, one or more smart cards, one or more magnetic disc storage devices, and/or one or more optical storage devices. Memory 524 may store an operating system 526 that includes procedures (or a set of instructions) for handling various basic system services for performing hardware dependent tasks. The memory 524 may also store procedures (or a set of instructions) in a communication module 528. The communication procedures may be used for communicating with one or more computers and/or servers, including computers and/or servers that are remotely located with respect to the computer system 500.

Memory 524 may also include multiple program modules (or sets of instructions), including: lithography module 530 (or a set of instructions), MEEF module 532 (or a set of instructions), and design module 548 (or a set of instructions). Note that one or more of these program modules (or sets of instructions) may constitute a computer-program mechanism.

Lithography module 530 may determine one or more simulated wafer patterns 546 based on one or more optical paths 542, lithographic conditions 534 (such as the focus, the illumination and/or the source pattern during a photo-lithographic process) and one or more mask patterns 536. Note that lithography module 530 may include a photoresist model.

Then, MEEF module 532 may determine one or more full-field MEEFs, such as full-field MEEF A 540-1 and MEEF B 540-2, and/or DOF(s) 550 using one or more of simulated wafer patterns 546. These full-field MEEFs may include edge-based MEEF values corresponding to topological environments 538 associated with mask patterns 536.

Furthermore, full-field MEEFs 540 and/or DOF(s) 550 may be used to evaluate whether or not mask patterns 536 and/or lithographic conditions 534 are acceptable. In some embodiments, design module 550 is used to revise one or more of mask patterns 536 and/or lithographic conditions 534 based on one or more of full-field MEEFs 540 and/or DOF(s) 550. For example, design module 548 may (re-)calculate mask patterns 536 based on one or more target wafer patterns 544 using an inverse optical calculation.

Instructions in the various modules in the memory 524 may be implemented in a high-level procedural language, an object-oriented programming language, and/or in an assembly or machine language. The programming language may be compiled or interpreted, i.e., configurable or configured to be executed by the one or more processors 510.

Although the computer system 500 is illustrated as having a number of discrete items, FIG. 5 is intended to be a functional description of the various features that may be present in the computer system 500 rather than as a structural schematic of the embodiments described herein. In practice, and as recognized by those of ordinary skill in the art, the functions of the computer system 500 may be distributed over a large number of servers or computers, with various groups of the servers or computers performing particular subsets of the functions. In some embodiments, some or all of the functionality of the computer system 500 may be implemented in one or more ASICs, one or more field programmable gate arrays (FPGAs), and/or one or more digital signal processors (DSPs).

In some embodiments, the analysis technique may be implemented as a stand-alone software application, or as a program module or subroutine in another application, such as photo-mask design software. Furthermore, the software may be configured to execute on a client or local computer, such as: a personal computer, a laptop computer, or other device capable of manipulating computer readable data, or between two or more computing systems over a network (such as the Internet, World Wide Web or WWW, Intranet, LAN, WAN, MAN, or combination of networks, or other technology enabling communication between computing systems). Therefore, information used when determining the full-field MEEF may be stored locally (for example, on the local computer) and/or remotely (for example, on a computer or server that is accessed via a network).

Computer system 500 may include fewer components or additional components, two or more components may be combined into a single component, and/or a position of one or more components may be changed. In some embodiments the functionality of the computer system 500 may be implemented more in hardware and less in software, or less in hardware and more in software, as is known in the art.

Note that the preceding embodiments may be used for mask patterns corresponding to: chromium-on-glass photo-masks, alternating phase-shifting photo-masks, attenuating phase-shifting photo-masks, and/or multiple-exposure photo-masks (i.e., where patterns printed using two or more photo-masks are combined to produce a desired pattern).

We now discuss data structures that may be used in the computer system 500 (FIG. 5). FIG. 6 presents a block diagram illustrating a data structure 600. This data structure may include information corresponding to one or more simulated wafer patterns 610. For a given simulated wafer pattern, such as simulated wafer pattern 610-1, data structure 600 may include: features 612-1, positions 614-1 associated with features 612-1, contours 616-1 associated with features 612-1, and/or topological environments 618-1 associated with features 612-1.

FIG. 7 presents a block diagram illustrating a data structure 700. This data structure may include information corresponding to one or more full-field MEEFS 710. For a given full-field MEEF, such as full-field MEEF 710-1, data structure 700 may include: MEEF values 712-1, positions 714-1 associated with MEEF values 712-1, and optional contours 616-1 associated with MEEF values 712-1.

Note that in some embodiments of data structures 600 and/or 700 there may be fewer or additional components, two or more components may be combined into a single component, and/or a position of one or more components is changed. For example, data structure 600 may include information about the lithographic conditions, such as the type of illumination (such as disk, point, annulus, sigmas, etc.) and/or the details of the optics (such as one or more wavelengths used or the numerical aperture).

While the preceding discussion has focused on an analysis technique for determining a full-field MEEF associated with a mask pattern, in other embodiments these techniques may also be applied to determine the full-field sensitivity of the wafer pattern to changes in the position of a direct write beam (or because of interaction effects, such as electron-beam scattering) in optical or electron-beam direct-write lithography. Similarly, the analysis technique may be generalized to determine another full-field design-for-manufacturing parameter or metric for a photo-lithographic process (such as a metric associated with separate or concurrent design of the source pattern that is to be used to illuminate a photo-mask) and/or a direct-write process. The other full-field design-for-manufacturing parameter or metric may include: the depth of focus, a process-variation band, an edge-placement-error map and/or a process window.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for determining a full-field Mask Error Enhancement Function (MEEF) associated with a mask pattern for use in a photo-lithographic process, comprising:
   generating, by a computer, one or more simulated wafer patterns corresponding to the mask pattern at an image plane in an optical path associated with the photo-lithographic process; and
   determining the full-field MEEF, which includes MEEF values in a plurality of directions at positions along one or more contours that define boundaries of one or more features in the one or more simulated wafer patterns, wherein at least one of the MEEF values corresponds to a position on a contour where a critical dimension for a feature associated with the contour is undefined.

2. The method of claim 1, wherein the one or more simulated wafer patterns include one or more aerial images.

3. The method of claim 2, wherein the simulated mask pattern used to generate an aerial image in the one or more aerial images is biased, wherein the bias includes a geometric change in a feature in the mask pattern relative to an initial mask pattern.

4. The method of claim 1, wherein determining the full-field MEEF involves calculating a gradient of the one or more simulated wafer patterns along normals to the one or more contours.

5. The method of claim 4, wherein the gradient includes a derivative of the one or more simulated wafer patterns along the normals to the one or more contours.

6. The method of claim 3, wherein determining the full-field MEEF involves calculating a ratio of a change in the one or more contours relative to the bias.

7. The method of claim 2, wherein the one or more simulated wafer patterns include a simulated development of photoresist.

8. The method of claim 1, wherein the one or more simulated wafer patterns are calculated using a forward optical calculation with the mask pattern at an object plane of the optical path.

9. The method of claim 1, wherein a MEEF value is determined for the contour.

10. The method of claim 1, wherein a MEEF value is determined for a pair of contours on opposite sides of a feature in the one or more simulated wafer patterns.

11. The method of claim 1, wherein the full-field MEEF is in a pixel based format.

12. The method of claim 11, wherein the pixels have a regular spacing.

13. The method of claim 1, wherein the full-field MEEF is in a segment based format.

14. The method of claim 1, wherein the full-field MEEF is a two-dimensional function.

15. The method of claim 1, wherein a MEEF value in the full-field MEEF corresponds to a topological environment of a feature in the one or more simulated wafer patterns.

16. A computer-program product for use in conjunction with a computer system, the computer-program product comprising a non-transitory computer-readable storage medium and a computer program mechanism embedded therein for determining a full-field Mask Error Enhancement Function (MEEF) associated with a mask pattern for use in a photo-lithographic process, the computer-program mechanism including:
   instructions for generating one or more simulated wafer patterns corresponding to the mask pattern at an image plane in an optical path associated with the photo-lithographic process; and
   instructions for determining the full-field MEEF, which includes MEEF values in a plurality of directions at positions along one or more contours that define boundaries of one or more features in the one or more simulated wafer patterns, wherein at least one of the MEEF values corresponds to a position on a contour where a critical dimension for a feature associated with the contour is undefined.

17. The computer-program product of claim 16, wherein the one or more simulated wafer patterns include one or more aerial images; and
   wherein the mask pattern used to generate an aerial image in the one or more images is biased, wherein the bias includes a geometric change in a feature in the mask pattern relative to an initial mask pattern.

18. The computer-program product of claim 16, wherein a MEEF value is determined for a pair of contours on opposite sides of a feature in the one or more simulated wafer patterns.

19. A computer system, comprising:
a computer processor;
a computer-readable storage medium; and
a program module for determining a source pattern to illuminate a photo-mask during a photo-lithographic process, the program module stored in the computer-readable storage medium and configured to be executed by the computer processor, wherein the program module is configured to determine a full-field Mask Error Enhancement Function (MEEF) associated with a mask pattern for use in a photo-lithographic process, the program module including:
instructions for generating one or more simulated wafer patterns corresponding to the mask pattern at an image plane in an optical path associated with the photo-lithographic process; and
instructions for determining the full-field MEEF, which includes MEEF values in a plurality of directions at positions along one or more contours that define boundaries of one or more features in the one or more simulated wafer patterns, wherein at least one of the MEEF values corresponds to a position on a contour where a critical dimension for a feature associated with the contour is undefined.

20. A digital representation of an integrated circuit (IC) generated by a method for determining a full-field Mask Error Enhancement Function (MEEF) associated with a mask pattern for use in a photo-lithographic process to manufacture the IC, the method comprising:
generating, by a computer, one or more simulated wafer patterns corresponding to the mask pattern at an image plane in an optical path associated with the photo-lithographic process; and
determining the full-field MEEF, which includes MEEF values in a plurality of directions at positions along one or more contours that define boundaries of one or more features in the one or more simulated wafer patterns, wherein at least one of the MEEF values is for a position on a contour where a critical dimension for a feature associated with the contour is undefined.

* * * * *